United States Patent [19]

Wheeler

[11] Patent Number: 4,532,731

[45] Date of Patent: Aug. 6, 1985

[54] FISHING LINE HEIGHT ADJUSTER AND FRICTION SLIDER

[76] Inventor: Robert Wheeler, 823A E. Gulf Blvd., Indian Rocks Beach, Fla. 33535

[21] Appl. No.: 478,682

[22] Filed: Mar. 25, 1983

[51] Int. Cl.³ .................... A01K 91/04; A01K 93/00
[52] U.S. Cl. .................. 43/43.13; 43/44.87; 24/169; 24/198
[58] Field of Search ............. 43/43.13, 44.87, 44.95, 43/42.11, 42.19, 43.13, 43.1, 43.91; 24/456, 458, 464, 482, 472, 545, 129 D, 171, 115 H, 115 L, 129 A, 169, 197, 198, 200, 131 R, 131 C, 163, 129 R, 129 B

[56] References Cited

U.S. PATENT DOCUMENTS

| | | | |
|---|---|---|---|
| 176,440 | 4/1876 | Nerney | 24/169 |
| 2,247,583 | 7/1941 | Louthan | 43/43.13 |
| 2,520,562 | 8/1950 | Peeler | 43/43.13 |
| 2,561,371 | 7/1951 | Hill | 24/129 R |
| 2,744,352 | 5/1956 | Holgerson | 43/43.13 |
| 2,808,632 | 10/1957 | Cline | 24/115 H |
| 3,218,686 | 11/1965 | Rubenstein | 24/198 |
| 3,418,787 | 12/1968 | Smith | 24/129 R |
| 3,677,543 | 7/1972 | Richardson | 24/129 R |
| 3,988,850 | 11/1976 | Steinman | 24/115 H |
| 4,077,091 | 3/1978 | Liljedahl | 24/198 |
| 4,109,905 | 8/1978 | Meier | 24/115 H |
| 4,361,977 | 12/1982 | Lawler | 43/44.95 |

Primary Examiner—Nicholas P. Godici
Assistant Examiner—M. Jordan
Attorney, Agent, or Firm—Stanley M. Miller

[57] ABSTRACT

A trolling depth adjusting device is disclosed which includes a vane having a forward corner with a first hole and the aftward corner having a second hole. The device further includes a principal line passing from the upward facing surface of the vane, slideably through the forward corner to the underside of the vane and then passing from the underside, slideably through the aftward corner and terminating in a lower end connected to a fishing hook. The device further includes a weight slideably mounting on the principal line and unique adjustable stop mounted on the principal line between the lower end thereof and the second hole in the vane. The weight forces the vane to slide downwardly on the principal line toward the stop when the tension between the trolling line and the hook is relatively low, causing the vane to be disposed at an acute attack angle with respect to the pulling force direction of the trolling line, enabling the vane to apply a downwardly directed reactive force on the trolling line as the vane is pulled through the water. The principal line forces the vane to slide upwardly when the tension between the trolling line and the hook is relatively high, causing the vane to become parallel with the pulling force direction of the trolling line, enabling the vane to apply a lower reactive force on the trolling line as the vane is pulled through the water. In this manner, the fish may be retrieved with less tension on the vane.

14 Claims, 11 Drawing Figures

FIG. 5
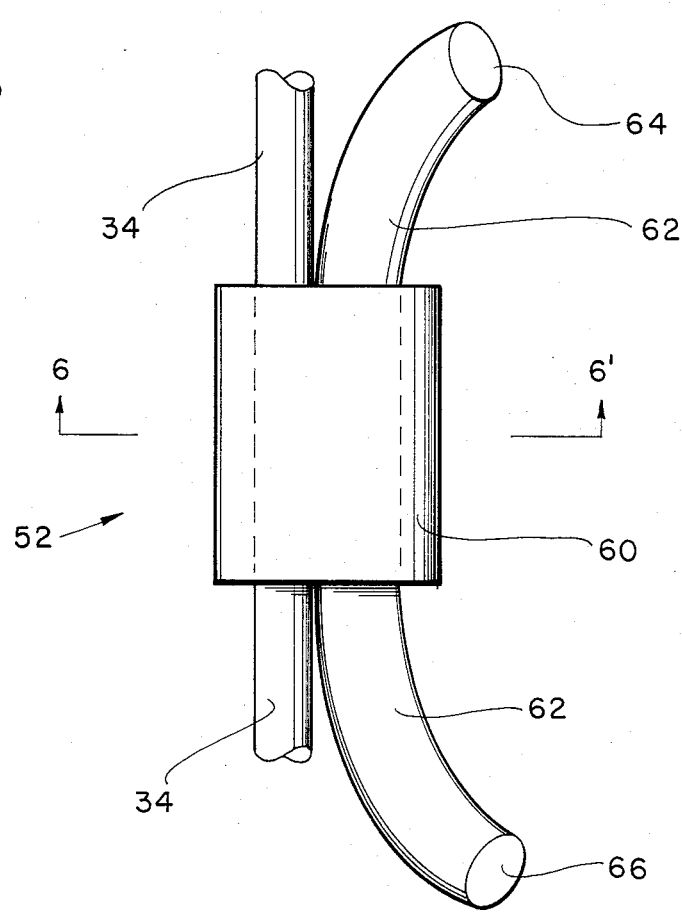
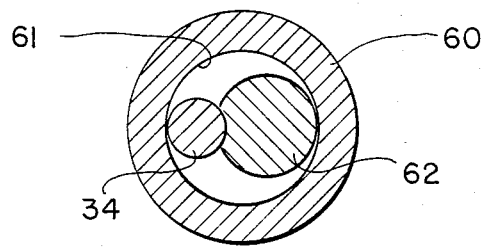
FIG. 6
SEC. 6-6'
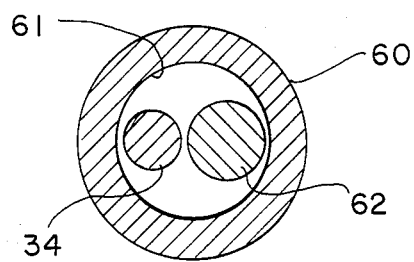
FIG. 7

SEC. 9-9'

SEC. 11-11

4,532,731

FISHING LINE HEIGHT ADJUSTER AND FRICTION SLIDER

FIELD OF THE INVENTION

The invention disclosed broadly relates to fishing gear and more particularly relates to improvements in fishing line height adjusters and friction sliders.

BACKGROUND OF THE INVENTION

Schools of salt water and fresh water fish will settle at various depths in the water depending on factors such as temperature, food availability, light levels, and the like. When trolling, it is of course necessary to adjust the depth of the fishing lure or bait so that it comes into close proximity with the school of fish under a given set of conditions. The prior art approach to solving this problem was to apply a varying amount of lead or other weight to the fishing line or to a height adjusting mechanism or to use different sizes of height adjusting mechanisms in order to achieve the desired depth for the hook.

OBJECTS OF THE INVENTION

It is therefor an object of the invention to provide an improved height adjusting mechanism for fishing lines.

It is another object of the invention to provide a height adjusting mechanism for a fishing line which is suitable for a variety of trolling depths.

It is still a further object of the invention to provide a continuously adjustable fishing line height adjusting mechanism which can be simply and easily adjusted to acheive a variety of trolling heights in an improved manner.

It is yet another object of the invention to provide an improved height adjusting mechanism which applies a continuously variable downward reactive force on the trolling line while being towed through the water and yet assumes a low fluid resistance profile for pulling the fishing tackle out of the water after a fish has been caught.

SUMMARY OF THE INVENTION

These and other objects, features and advantages of the invention are accomplished by the fishing line height adjuster and friction slider invention disclosed herein. A trolling depth adjusting device is disclosed which includes a vane having a forward corner with a first hole and the aftward corner having a second hole. The device further includes a principal line passing from the upward facing surface of the vane, slideably through the forward corner to the underside of the vane and then passing from the underside, slideably through the aftward corner and terminating in a lower end connected to a fishing hook. The device further includes a weight slideably mounted on the principal line and a unique adjustable stop mounted on the principal line between the lower end thereof and the second hole in the vane. The weight forces the vane to slide downwardly on the principal line toward the stop when the tension between the trolling line and the hook is relatively low, causing the vane to be disposed at an acute attack angle with respect to the pulling force direction of the trolling line, enabling the vane to apply a downwardly directed reactive force on the trolling line as the vane is pulled through the water. The principal line forces the vane to slide upwardly when the tension between the trolling line and the hook is relatively high, causing the vane to become parallel with the pulling force direction of the trolling line, enabling the vane to apply a lower reactive force on the trolling line as the vane is pulled through the water. In this manner, the fish may be retrieved with less tension on the vane.

The adjustable stop friction slider controls the acute attack angle of the vane in the water. The adjustable stop includes a cylindrical body having a coaxial hole therethrough having a cross sectional dimension, mounted in sliding engagement on the principal line. The adjustable stop further includes an elastic strand passing through the hole in the cylindrical body, having a diameter approximately the same as the cross sectional dimension of the coaxial hole when the strand is not operatively placed in tension, thereby applying a compressive transverse force against the interior surface of the coaxial hole and against the principal line as it passes through the coaxial hole, thereby causing the cylindrical body to frictionally engage the principal line. In a second state, the strand assumes a diameter substantially less than the cross sectional dimension of the coaxial hole when the strand is operatively placed in tension, thereby causing the cylindrical body to freely slide along the principal line.

DESCRIPTION OF THE FIGURES

These and other objects, features and advantages of the invention will be more fully appreciated with reference to the accompanying figures.

FIG. 5 is a side view of the adjustable stop friction slider feature of the invention.

FIG. 6 is a cross sectional view along the section line 6-6' of FIG. 5, illustrating the transverse compression of the elastic strand 62 against the inner wall of the cylinder 60 and against the line 34 while the strand is in a relaxed state of longitudinal tension, thereby causing the adjustable stop friction slider 52 to frictionally grip the line 34.

FIG. 7 is a view similar to that of FIG. 6, showing the reduced cross sectional size of of the elastic strand 62 when it is in a state of operatively applied longitudinal tension, allowing the adjustable stop friction slider to freely slide on the line 34.

DISCUSSION OF THE PREFERRED EMBODIMENT

Figure 1:
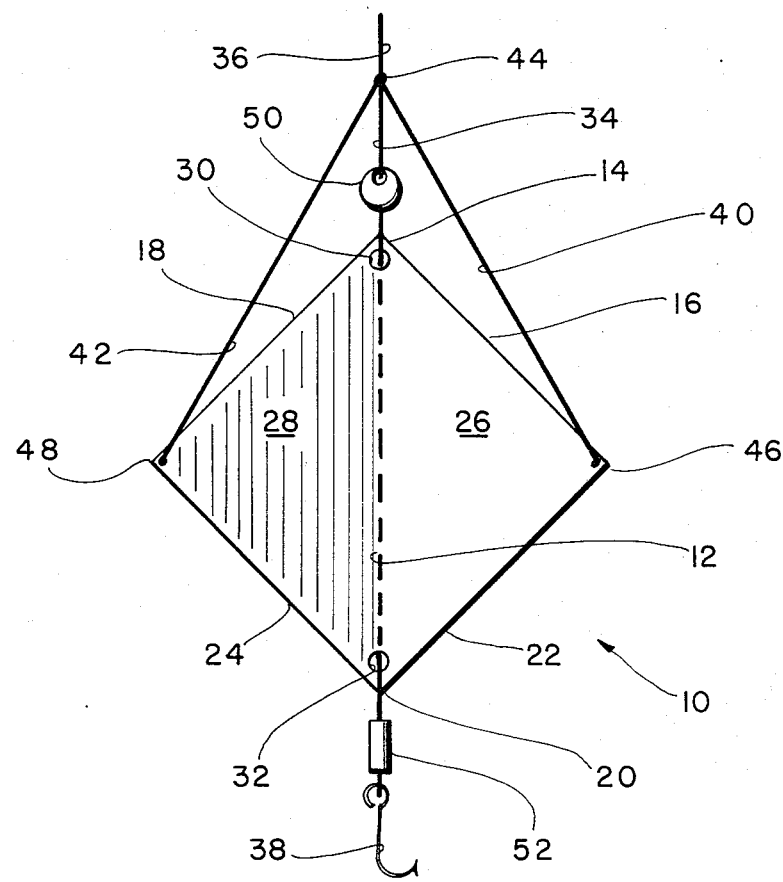
FIG. 1 is a top view of the fishing line height adjuster and friction slider invention.
Figure 2:
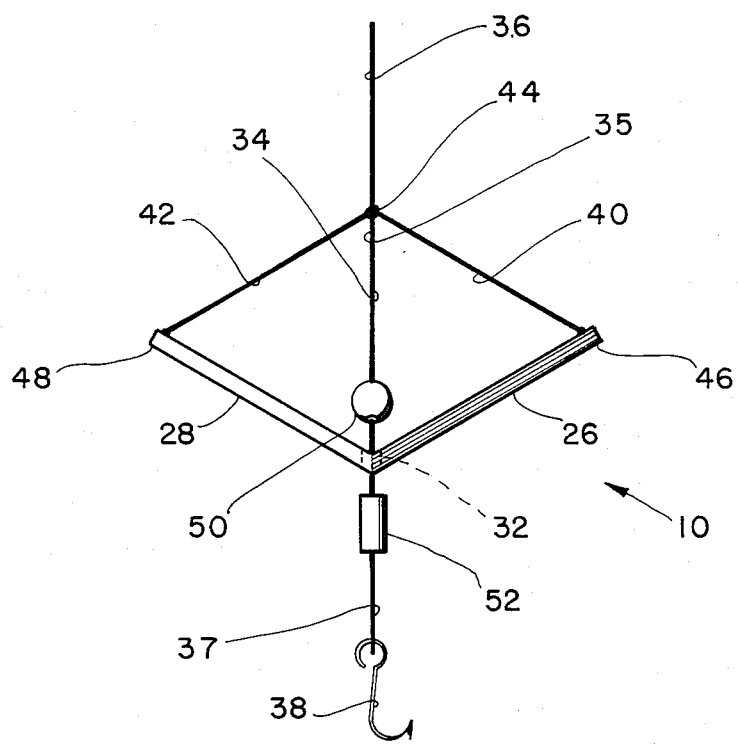
FIG. 2 is a view of the aft side of the invention.
Figure 3:
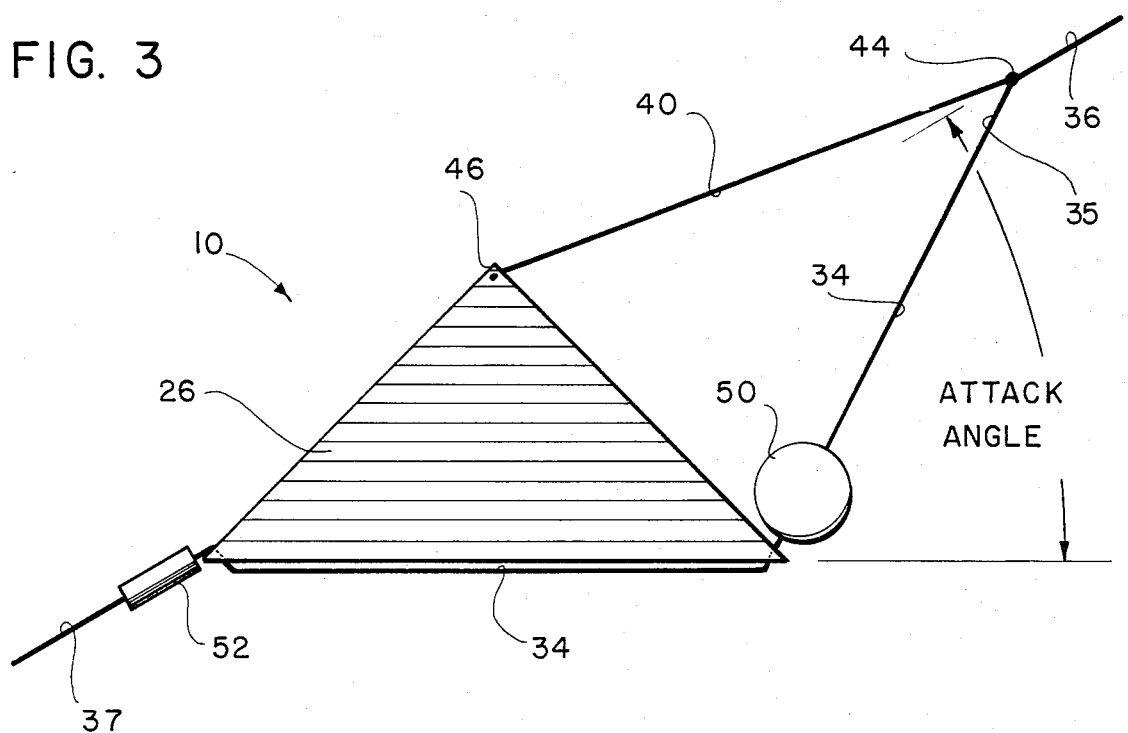
FIG. 3 is a side view of the invention, with the vane 10 assuming an acute attack angle while being pulled through the water.
Figure 4:
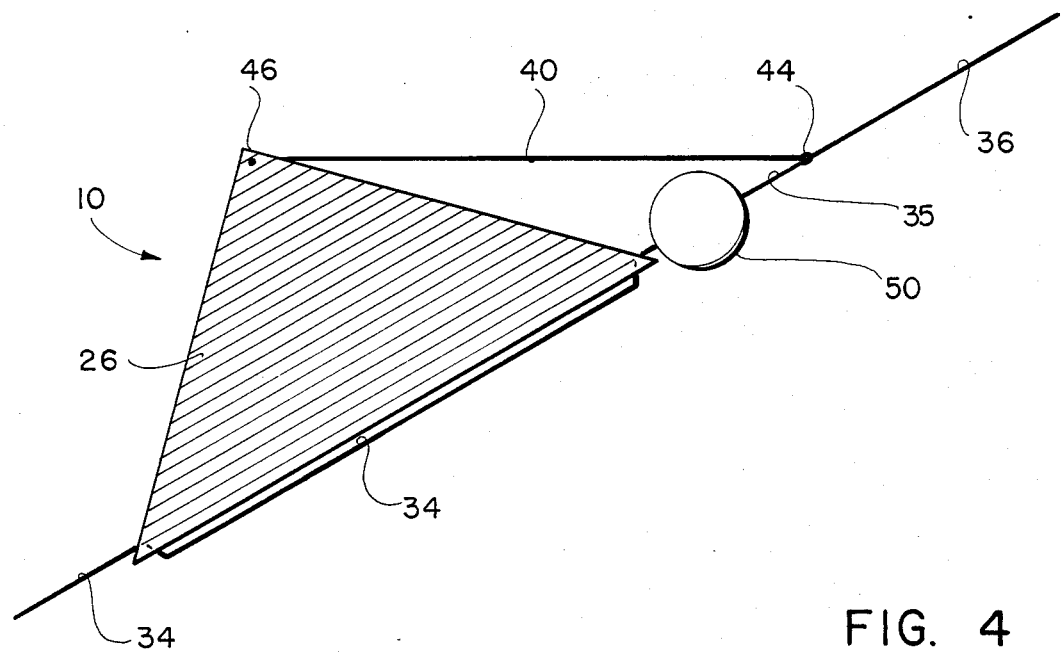
FIG. 4 is a side view of the invention, with the vane assuming a low fluid resistance profile while being pulled through the water.

FIGS. 1 through 7 show various aspects of the trolling depth adjusting device invention, with FIGS. 5 through 7 focusing on the unique adjustable stop friction slider feature 52.

The invention includes a vane 10 having a generally square shape which is bent at an upwardly facing oblique angle along a diagonal bend axis 12 between a forwardly directed corner 14 formed by first and second sides 16 and 18 of the square and an aftwardly directed corner 20 formed by third and fourth sides 22 and 24 of the square, forming a first upwardly facing vane surface 26 bounded by the diagonal bend 12 and the first and third sides 16 and 22 and forming a second upwardly facing vane surface 28 bounded by the diagonal bend 12 and the second and fourth sides 18 and 24. The forwardly directed corner 14 has a first hole 30 therethrough and the aftward corner 20 has a second hole 32 therethrough.

The invention further includes a principal line 34 having an upper end 35 connected to a trolling line 36 having a pulling force direction, passing from the upward facing surface of the vane 10, slideably through the first hole 30 in the forwardly directed corner 14 to the underside of the vane 10 and then passing from the underside, slideably through the second hole 32 in the aftwardly directed corner 20 and terminating in a lower end 37 connected to a fishing hook 38.

The invention further includes a first and second stabilizing lines 40 and 42 fastened to a tie point 44 at the upper end 35 of the principal line 34, the first stabilizing line 40 being fastened to a third corner 46 of the vane 10 formed by the first and third sides 16 and 22 of the square and the second stabilizing line 42 being fastened to a fourth corner 48 of the vane 10 formed by the second and fourth sides 18 and 24 of the square.

The invention further includes a weight 50 slideably mounted on the principal line 34 between the tie point 44 and the first hole 30 in the vane 10.

A particularly unique feature of the invention is the adjustable stop friction slider 52 shown in FIGS. 5 through 7, which is mounted on the principal line 34 between the lower end 37 thereof and the second hole 32 in the vane 10.

The invention operates by the weight 50 forcing the vane 10 to slide downwardly on the principal line 34 toward the stop 52 when the tension between the trolling line 36 and the hook 38 is relatively low, causing the diagonal bend axis 12 of the vane 10 to be disposed at an acute attack angle with respect to the pulling force direction of the trolling line 36, enabling the first and second upwardly facing vane surfaces 26 and 28 to apply a downwardly directed reactive force on the trolling line 36 as the vane 10 is pulled through the water.

In a second mode of operation, the first and second stabilizing lines 40 and 42 and the principal line 34 will be forcing the vane 10 to slide upwardly on the principal line 34 toward the tie point 44 when the tension between the trolling line 36 and the hook 38 is relatively high, causing the diagonal bend axis 12 of the vane 10 to be disposed in an approximately parallel orientation with respect to the pulling force direction of the trolling line 36, enabling the vane 10 to apply a substantially lower reactive force on the trolling line 36 as the 10 vane is pulled through the water. In this manner, the depth of the vane in the water can be controlled as it is pulled by the trolling line, and yet the vane will assume a low fluid resistance profile when a fish strikes the hook, thereby enabling the fishing tackle and the fish to be more easily reeled in.

One of the unique features of the adjustable stop 52 is its ability to control the acute attack angle of the vane 10 in the water. The lower down the principal line 34 the stop 52 is positioned, the greater will be the angle of attack of the vane as it is pulled through the water, and thus the greater will be the reactive downward force of the vane on the trolling line. This will then govern the effective depth at which the device will glide as it is pulled through the water by the trolling line.

The adjustable stop friction slider 52 further includes a cylindrical body 60 having a coaxial hole 61 therethrough having a cross sectional dimension, mounted in sliding engagement on the principal line 34.

The adjustable stop friction slider 52 further includes an elastic strand 62 passing through the hole 61 in the cylindrical body 60, having a diameter approximately the same as the cross sectional dimension of the coaxial hole 61 when the strand 62 is not operatively placed in tension, as is shown in FIG. 6, thereby applying a compressive transverse force against the interior surface of the coaxial hole 61 and against the principal line 34 as it passes through the coaxial hole 61, thereby causing the cylindrical body 60 to frictionally engage the principal line 34.

In a second state, the strand 62 assumes a diameter substantially less than the cross sectional dimension of the coaxial hole 61 when the strand 62 is operatively placed in tension, as is shown in FIG. 7, thereby causing the cylindrical body 60 to freely slide along the principal line 34.

The vane 10 can be composed of a hydrocarbon plastic and can be a thermoformed sheet of thermoplastic material.

The cylindrical body 60 can be composed of a hydrocarbon plastic material. The strand 62 can be composed of an elastomer material such as an elastic rubber.

Figure 8:
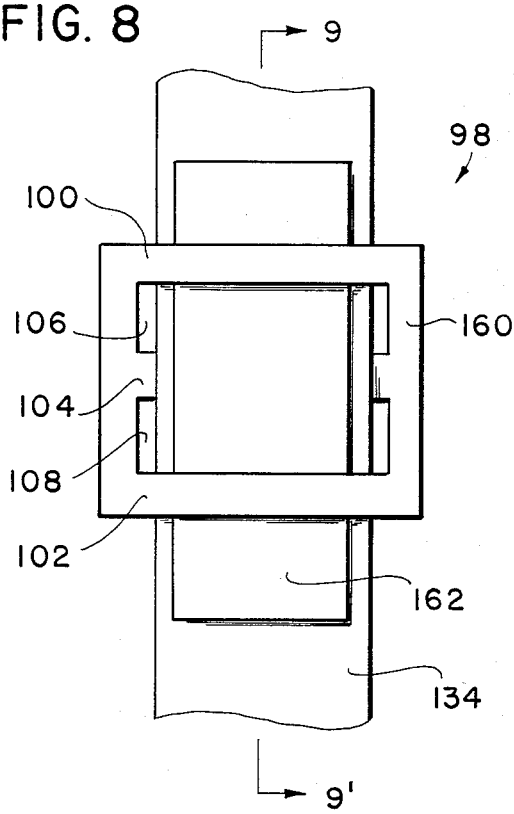
FIG. 8 is a front view of a second embodiment of the adjustable stop friction slider feature of the invention.
Figure 9:
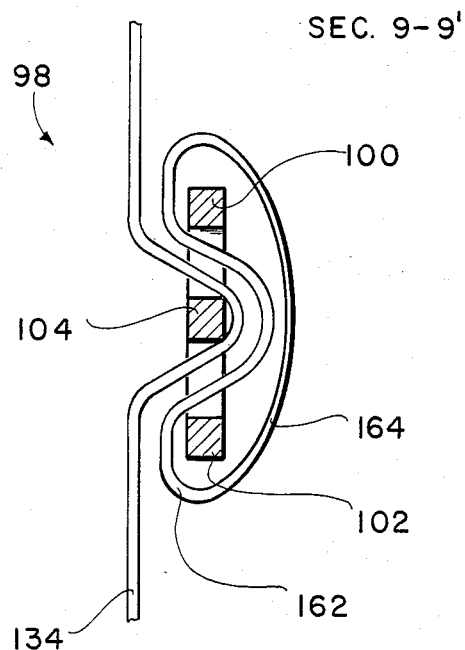
FIG. 9 is a side cross sectional view along the section line 9-9' of FIG. 8.

A second embodiment of the adjustable stop friction slider is shown in FIGS. 8 and 9, which includes a buckle-shaped body 98 having first and second holes 108 and 106 therethrough, respectively bounded by a lower and an upper bar 102 and 100 and mutually separated by a central cross bar 104. The body 98 is mounted in sliding engagement on the line 134 which passes through the first hole 108, over the cross bar 104, and then through the second hole 106.

An elastic strand 162 passes through the first and second holes 108 and 106 in the body 98, having a first surface contacting the upper and lower bars 100 and 102 and a second opposed surface contacting the line 134. The strand 162 has a first cross sectional dimension when the strand is not operatively placed in tension, thereby applying a compressive transverse force against the interior surfaces of the upper and lower bars 100 and 102 and against the line 134 as it passes over the cross bar 104, thereby causing the body 98 to frictionally engage the line 134.

The strand 162 will assume a second cross sectional dimension substantially less than the first cross sectional dimension when the strand 162 is operatively placed in tension, thereby relaxing the transverse compression force and causing the body 98 to freely slide along the line 134.

The body may be composed of a metallic material and the strand may be composed of an elastomer material such as an elastic rubber. The line 134 and the strand 162 may be a flat webbing. The ends of the strand 162 may be joined to form a pull ring 164 which can be grasped to operatively place the strand 162 in the tension to thereby make the body 98 freely slide on the line 134.

Figure 10:
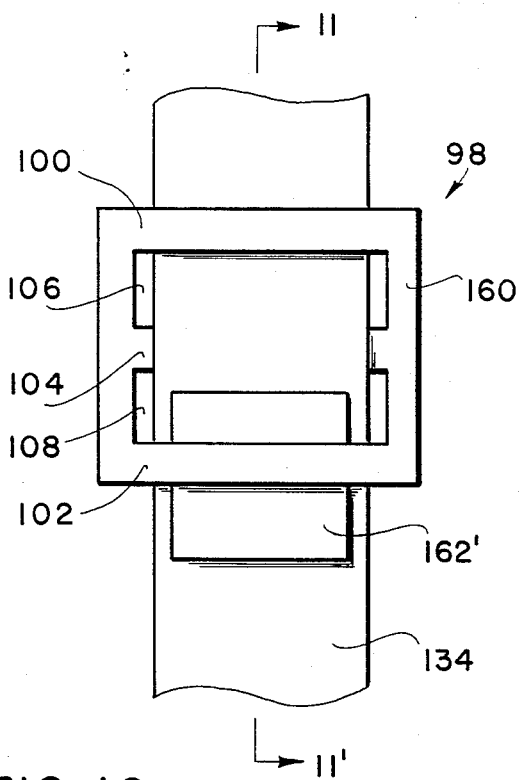
FIG. 10 is a front view of a third embodiment of the adjustable stop friction slider feature of the invention.
Figure 11:
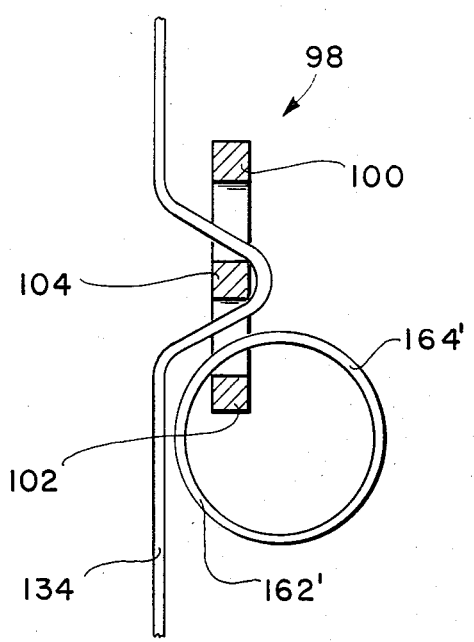
FIG. 11 is a side cross sectional view along the section line 11-11' of FIG. 10.

A third embodiment of the adjustable stop friction slider is shown in FIGS. 10 and 11, which has the elastic strand 162' passing through the first hole 108 in the body 98, having a first surface contacting the lower bar 102 and a second opposed surface contacting the line 134, the strand 162' having a first cross sectional dimension when the strand 162' is not operatively placed in tension, thereby applying a compressive transverse force against the interior surface of the lower bar 102 and against the line 134 as it passes over the cross bar 104, thereby causing the body 98 to frictionally engage the line 134.

The strand 162' assumes a second cross sectional dimension substantially less than the first cross sectional dimension when the strand 162' is operatively placed in tension, thereby relaxing the transverse compression force and causing the body 98 to freely slide along the line 134. The line 134 and the strand 162' can be a flat webbing. The ends of the strand 162' can be joined to form a pull ring 164' which can be grasped to operatively place the strand 162' in the tension to thereby make the body 98 freely slide on the line 134.

There results an improved height adjusting mechanism for fishing lines which is suitable for a variety of trolling depths. The invention provides a continuously adjustable fishing line height adjusting mechanism which can be simply and easily adjusted to acheive a variety of trolling heights in an improved manner. The device applies a continuously variable downward reactive force on the trolling line while being towed through the water and yet assumes a low fluid resistance profile for pulling the fishing tackle out of the water after a fish has been hooked.

What is claimed is:

1. A trolling depth adjusting device, comprising:
  a vane having a generally square shape which is bent at an upwardly facing oblique angle along a diagonal bend axis between a forwardly directed corner formed by first and second sides of said square and an aftwardly directed corner formed by third and fourth sides of said square, forming a first upwardly facing vane surface bounded by said diagonal bend and said first and third sides and forming a second upwardly facing vane surface bounded by said diagonal bend and said second and fourth sides, said forwardly directed corner having a first hole therethrough and said aftward corner having a second hole therethrough;
  a principal line having an upper end connected to a trolling line having a pulling force direction, passing from the upward facing surface of said vane, slideably through said first hole in said forwardly directed corner to the underside of said vane and then passing from said underside, slideably through said second hole in said aftwardly directed corner and terminating in a lower end connected to a fishing hook;
  a first and second stabilizing lines fastened to a tie point at said upper end of said principal line, said first stabilizing line being fastened to a third corner of said vane formed by said first and third sides of said square and said second stabilizing line being fastened to a fourth corner of said vane formed by said second and fourth sides of said square;
  a weight slideably mounted on said principal line between said tie point and said first hole in said vane;
  an adjustable stop mounted on said principal line between said lower end thereof and said second hole in said vane;
  said weight forcing said vane to slide downwardly on said principal line toward said stop when the tension between said trolling line and said hook is relatively low, causing said diagonal bend axis of said vane to be disposed at an acute attack angle with respect to said pulling force direction of said trolling line, enabling said first and second upwardly facing vane surfaces to apply a downwardly directed reactive force on said trolling line as said vane is pulled through the water;
  said first and second stabilizing lines and said principal line forcing said vane to slide upwardly on said principal line toward said tie point when the tension between said trolling line and said hook is relatively high, causing said diagonal bend axis of said vane to be disposed in an approximately parallel orientation with respect to said pulling force direction of said trolling line, enabling said vane to apply a substantially lower reactive force on said trolling line as said vane is pulled through the water;
  whereby a hooked fish can be more easily retrieved.

2. The apparatus of claim 1, wherein said adjustable stop controls said acute attack angle of said vane in the water.

3. The apparatus of claim 2, wherein said adjustable stop further comprises:
  a cylindrical body having a coaxial hole therethrough having a cross sectional dimension, mounted in sliding engagement on said principal line;
  an elastic strand passing through said hole in said cylindrical body, having a diameter approximately the same as said cross sectional dimension of said coaxial hole when said strand is not operatively placed in tension, thereby applying a compressive transverse force against the interior surface of said coaxial hole and against said principal line as it passes through said coaxial hole, thereby causing said cylindrical body to frictionally engage said principal line;
  said strand assuming a diameter substantially less than said cross sectional dimension of said coaxial hole when said strand is operatively placed in tension, thereby causing said cylindrical body to freely slide along said principal line.

4. The apparatus of claim 3, wherein said vane is composed of a hydrocarbon plastic.

5. The apparatus of claim 4, wherein said vane is a thermoformed sheet of thermoplastic material.

6. The apparatus of claim 5, wherein said cylindrical body is composed of a hydrocarbon plastic material.

7. The apparatus of claim 6, wherein said strand is composed of an elastomer material.

8. The apparatus of claim 7, wherein said strand is composed of an elastic rubber.

9. A trolling depth adjusting device, comprising:
  a vane having a generally square shape which is bent at an upwardly facing oblique angle along a diagonal bend axis between a forwardly directed corner formed by first and second sides of said square and an aftwardly directed corner formed by third and fourth sides of said square, forming a first upwardly facing vane surface bounded by said diagonal bend and said first and third sides and forming a second upwardly facing vane surface bounded by said diagonal bend and said second and fourth sides, said forwardly directed corner having a first hole therethrough and said aftward corner having a second hole therethrough;

a principal line having an upper end connected to a trolling line having a pulling force direction, passing from the upward facing surface of said vane, slideably through said first hole in said forwardly directed corner to the underside of said vane and then passing from said underside, slideably through said second hole in said aftwardly directed corner and terminating in a lower end connected to a fishing hook;

a first and second stabilizing lines fastened to a tie point at said upper end of said principal line, said first stabilizing line being fastened to a third corner of said vane formed by said first and third sides of said square and said second stabilizing line being fastened to a fourth corner of said vane formed by said second and fourth sides of said square;

a weight slideably mounted on said principal line between said tie point and said first hole in said vane;

an adjustable stop mounted on said principal line between said lower end thereof and said second hole in said vane;

said weight forcing said vane to slide downwardly on said principal line toward said stop when the tension between said trolling line and said hook is relatively low, causing said diagonal bend axis of said vane to be disposed at an acute attack angle with respect to said pulling force direction of said trolling line, enabling said first and second upwardly facing vane surfaces to apply a downwardly directed reactive force on said trolling line as said vane is pulled through the water;

said first and second stabilizing lines and said principal line forcing said vane to slide upwardly on said principal line toward said tie point when the tension between said trolling line and said hook is relatively high, causing said diagonal bend axis of said vane to be disposed in an approximately parallel orientation with respect to said pulling force direction of said trolling line, enabling said vane to apply a substantially lower reactive force on said trolling line as said vane is pulled through the water;

said adjustable stop including a cylindrical body having a coaxial hole therethrough having a cross sectional dimension, mounted in sliding engagement on said principal line;

said adjustable stop further including an elastic strand passing through said hole in said cylindrical body, having a diameter approximately the same as said cross sectional dimension of said coaxial hole when said strand is not operatively placed in tension, thereby applying a compressive transverse force against the interior surface of said coaxial hole and against said principal line as it passes through said coaxial hole, thereby causing said cylindrical body to frictionally engage said principal line;

said strand assuming a diameter substantially less than said cross sectional dimension of said coaxial hole when said strand is operatively placed in tension, thereby causing said cylindrical body to freely slide along said principal line.

10. The apparatus of claim 9, wherein said vane is composed of a hydrocarbon plastic.

11. The apparatus of claim 10, wherein said vane is a thermoformed sheet of thermoplastic material.

12. The apparatus of claim 11, wherein said cylindrical body is composed of a hydrocarbon plastic material.

13. The apparatus of claim 12, wherein said strand is composed of an elastomer material.

14. The apparatus of claim 13, wherein said strand is composed of an elastic rubber.

* * * * *